United States Patent [19]

Masuda et al.

[11] 4,209,641
[45] Jun. 24, 1980

[54] PROCESS FOR THE PRODUCTION OF POLYTETRAMETHYLENE ETHER GLYCOL

[75] Inventors: Takayoshi Masuda; Tsutomu Takase; Yoshimoto Watanabe; Fumio Yamazaki, all of Nagoya, Japan

[73] Assignee: Mitsui Toatsu Chemicals, Inc., Tokyo, Japan

[21] Appl. No.: 966,657

[22] Filed: Dec. 5, 1978

[30] Foreign Application Priority Data

Dec. 26, 1978 [JP] Japan ................................. 52-155682

[51] Int. Cl.² .............................................. C07C 41/00
[52] U.S. Cl. .................................................... 568/617
[58] Field of Search ......................................... 568/617

[56] References Cited
U.S. PATENT DOCUMENTS 3,712,930   1/1973   Matsuda et al. ..................... 568/617

OTHER PUBLICATIONS

Matsuda et al., A.C.S. Polymer Reprints, (1974), pp. 468-473.

*Primary Examiner*—Howard T. Mars
*Attorney, Agent, or Firm*—Fisher, Christen & Sabol

[57] ABSTRACT

An improved process for the production of polytetramethylene ether glycol is disclosed. Polytetramethylene ether glycol is obtained with a high yield by subjecting tetrahydrofuran to ring opening polymerization in the presence or absence of an organic solvent with the use of, as a catalyst, a lithium halide in conjunction with fuming sulfuric acid. Average molecular weight of the glycol product can be controlled in the range of 1000–3000 at will by varying the amounts of the lithium halide and fuming sulfuric acid used.

19 Claims, No Drawings

PROCESS FOR THE PRODUCTION OF POLYTETRAMETHYLENE ETHER GLYCOL

BACKGROUND OF THE INVENTION

This invention relates to a process for the production of polytetramethylene ether glycol and more particularly to a process for producing polytetramethylene ether glycol by subjecting tetrahydrofuran to ring opening polymerization using, as a catalyst, a lithium halide in conjunction with fuming sulfuric acid.

Polytetramethylene ether glycol is a superior raw material for improved polyurethane resins having excellent elasticity, low temperature properties, resistance to hydrolysis in comparison with polypropylene ether glycol or a polyester glycol. The polyurethane resins are widely used as an elastic fiber Spandex, elastomer and the like.

Polytetramethylene ether glycol is generally produced by ring opening polymerization of tetrahydrofuran. Industrially useful polytetramethylene ether glycol is required to have an average molecular weight of from 650 to 3000 and to have hydroxyl groups as the terminal groups of its molecule chain. A variety of catalysts have been heretofore proposed for the ring opening polymerization of tetrahydrofuran. But only a few of them have been industrially employed, such as anhydrous acetic acid-perchloric acid mixture, fluorosulfonic acid, fuming sulfuric acid and the like.

These industrially employed catalysts, however, still have certain drawbacks. For example, in the anhydrous acetic acid-perchloric acid catalyst, anhydrous acetic acid needs to be used in a large amount. Further, a long polymerization time is required owing to its low catalytic activity. The fluorosulfonic acid catalyst is very expensive. Moreover, with this catalyst, the yield of polymethylene ether glycol is relatively low. Additionally, this catalyst has a serious defect that the wall of apparatuses such as a reactor and hydrolysis apparatus is corroded by the catalyst. While fuming sulfuric acid is available in a low price, the yield of polytetramethylene ether glycol is generally not sufficient. Furthermore, this catalyst suffers from a fatal drawback that it is difficult to yield polytetramethylene ether glycol having an average molecular weight of larger than about 1000.

The present inventors have made an extensive study to overcome the drawbacks involved in the conventional processes and found that polytetramethylene ether glycol having an average molecular weight of about 1000 to 3000 can be easily produced, with a high yield and a reduced cost, by the use of a lithium halide in conjunction with fuming sulfuric acid as catalyst for ring opening polymerization of tetrahydrofuran. The present invention is based on this finding.

SUMMARY OF THE INVENTION

It is, accordingly, an object of the present invention to provide an improved process for the production of polytetramethylene ether glycol by ring opening polymerization of tetrahydrofuran.

Another object of this invention is to provide a process for the production of polytetramethylene ether glycol, in which tetrahydrofuran is subjected to ring opening polymerization in the presence of a novel catalyst.

A further object of this invention is to provide a process which allows the production of polytetramethylene ether glycol having an average molecular weight of 1000 to 3000 with a high yield by ring opening polymerization of tetrahydrofuran.

The present invention provides an improved process for the production of polytetramethylene ether glycol wherein tetrahydrofuran is subjected to ring opening polymerization in the presence or absence of an organic solvent using a catalyst. The improvement includes the use of, as the catalyst, a lithium halide in conjunction with fuming sulfuric acid.

The fuming sulfuric acid preferably contains free sulfuric anhydride in the concentration of 3-45 wt %, more preferably 10-40 wt % and is used generally in an amount of 3-60 wt %, preferably 5-45 wt % based on the weight of the tetrahydrofuran used.

The lithium halide includes lithium fluoride, lithium chloride, lithium bromide, lithium iodide and a mixture thereof. Of these, lithium chloride and lithium fluoride are preferable. The amount of the lithium halide used is in the range of 0.001-20 wt %, preferably 0.01-10 wt %, more preferably 0.05-5 wt % based on the weight of the tetrahydrofuran used.

The ring opening polymerization of tetrahydrofuran is performed with or without using an organic solvent at a temperature of $-40°$ to $50°$ C., preferably $-20°$ to $30°$ C. for 30 min to 10 hours, preferably 1 to 5 hours. This is followed by the addition of water to stop the polymerization reaction. The resulting polymerization reaction mass is heated together with water at $70°$ to $100°$ C. for 1 to 3 hours to convert a sulfuric ester group in one of the opposite terminals of the molecule chain of the polymerized product into a hydroxyl group by hydrolysis, thereby to produce desired polytetramethylene ether glycol.

The organic solvents usable in carrying out the polymerization is selected from butane, pentane, hexane, octane, isooctane, cyclohexane, methylcyclohexane, decahydronaphthalene, methylene chloride, chloroform, carbon tetrachloride, 1,2-dichloroethane, ethyl ether, isopropyl ether, butyl ether, isoamyl ether and dioxane.

DETAILED DESCRIPTION OF THE INVENTION

Though the tetrahydrofuran used in the process of this invention is desired to be free from impurities such as water, an impurities content of up to 5 wt % is permissive if the major component thereof is water. However, it is preferred that the water content in the tetrahydrofuran be less than about 0.5 wt %. With tetrahydrofuran containing above 5 wt % water, catalytic activities are considerably lowered. Further, the tetrahydrofuran may contain a small amount of other impurities such as maleic anhydride which is an unreacted raw material for producing tetrahydrofuran, or succinic anhydride, γ-butylolactone and 1,4-butanediol each being a hydration product of the maleic anhydride. The amount of each of these impurities is, however, desired to be as small as possible, preferably not greater than 1,000 ppm and more preferably less than 500 ppm.

The fuming sulfuric acid, used as one of the catalytic components in the process of this invention contains free sulfuric anhydride $SO_3$ in the concentration of 3-45 wt %, preferably 10-40 wt %. An content of the sulfuric anhydride over 45 wt % tends to cause carbonization of the polymerization mass, resulting in undesirable coloring thereof. Below 3 wt % sulfuric anhydride content, the polymerization fails to proceed satisfactorily.

While it is preferred that the lithium halide have no crystal water, lithium halide having crystal water may also be used. The lithium halide herein includes lithium fluoride, lithium chloride, lithium bromide and lithium iodide. Of these, lithium chloride and lithium fluoride are preferably and practically used. These lithium halides may be used singly or in combination.

The amount of the fuming sulfuric acid used varies depending upon its free sulfuric anhydride content. Generally, the acid is used in an amount of 3 to 60 wt %, preferably 5 to 45 wt % based on the tetrahydrofuran used.

The amount of the lithium halide varies depending mainly upon the intended average molecular weight of the glycol product. The halide is generally used in an amount of 0.001 to 20 wt %, preferably 0.01 to 10 wt %, more preferably 0.05 to 5 wt % based on the tetrahydrofuran employed.

In case the amount of any of the fuming sulfuric acid and the lithium halide is lower than the respective above-defined lower limits, the average molecular weight of the glycol product becomes lower than 1000 and the yield of the product is lowered. No additional benefit is obtained from amounts of these catalyst components over the above-defined respective upper limits. Not only that, it becomes troublesome to remove the residual catalyst from the polymerization product.

The following relationship exists between the amount of the fuming sulfuric acid or the lithium halide and the yield of the polytetramethylene ether glycol (the term "yield" is used herein as having nearly the same meaning as conversion of tetrahydrofuran) or its average molecular weight. Generally, the greater the amount of the fuming sulfuric acid, the higher becomes the yield of polytetramethylene ether glycol and the lower becomes slightly its average molecular weight. On the other hand, the greater the amount of the lithium halide, the higher become both the yield and the average molecular weight. Accordingly, it is possible to produce polytetramethylene ether glycol having any desirable average molecular weight in the range of 1000 to 3000 at will by properly selecting the amounts of and the ratio between the fuming sulfuric acid and lithium halide.

The catalyst may be charged in the reaction system in any suitable manners. Generally, lithium halide is first mixed with tetrahydrofuran, to which is then added fuming sulfuric acid; a previously prepared mixture of these catalyst components is added to tetrahydrofuran; or these components are added separately and simultaneously to tetrahydrofuran. In any case, it is preferred that the addition of the catalyst components to tetrahydrofuran be performed at a low temperature such as −40° to 50° C., preferably −20° to 30° C.

After adding the catalyst, polymerization is conducted for 30 min to 10 hours, preferably 1 to 5 hours. The polymerization temperature is generally in the range of −40° to 50° C., preferably −20° to 30° C. As the reaction temperature increases, both the yield and average molecular weight of polytetramethylene ether glycol are lowered. In case the polymerization time is extremely short, both the yield and average molecular weight of the glycol product become low. Polymerization time of at least 1 hour is generally sufficient to complete the polymerization and, thereafter, no distinctive change in the yield and average molecular weight will occur.

It is preferred that the addition of the catalyst to the reaction system and the subsequent polymerization be carried out in air free from moisture or in an inert gas atmosphere such as nitrogen.

The polymerization may be conducted either with or without using an organic solvent. Any organic solvents may be employed as far as it does not adversely affect the polymerization and is unreactive with the catalyst. Illustrative of suitable solvents are aliphatic or alicyclic hydrocarbons such as butane, pentane, hexane, octane, isooctance, cyclohexane, methylcyclohexane, decahydronaphthalene, etc.; halogenated aliphatic hydrocarbons such as methylene chloride, chloroform, carbon tetrachloride, 1,2-dichloroethane, etc.; and ethers such as ethyl ether, isopropyl ether, butyl ether, isoamyl ether, dioxane, etc. The solvent is generally used in an amount of 5 to 200 wt %, preferably 10 to 100 wt % based on the tetrahydrofuran used.

The completion of the polymerization of tetrahydrofuran can be determined by analysing the concentration of unreacted tetrahydrofuran remained in the polymerization mass. Also, it can be known from the fact that generation of polymerization heat has ceased or that the viscosity of the polymerization mass has reached to a predetermined value. After completion of the polymerization or after the above-described polymerization time has passed, the polymerization reaction mass is added with water to terminate the polymerization.

Since one of the opposite terminals of the molecule chain of the reaction product has a sulfuric acid ester group, the polymerization mass added with water is subsequently subjected to hydrolysis with heating, to convert the sulfuric acid ester group into a hydroxyl group whereby obtaining polytetramethylene ether glycol.

It is preferred that, after the termination of the polymerization, a greater part of or entire unreacted tetrahydrofuran and the solvent, if used, be removed prior to hydrolysis by any suitable ways such as distillation. The water to terminate the polymerization is added in an amount sufficient to prevent the growth of the polymers. However, excess amount of water can be used. Generally, a total amount of water used for terminating the polymerization and for effecting hydrolysis is suitably 50 to 300 wt % based on the tetrahydrofuran used. Reaction time of 1 to 3 hours at a temperature of 70°–100° C. is sufficient to complete the hydrolysis.

After completion of the hydrolysis, the reaction mixture is allowed to stand for separating it into an organic layer mainly composed of polytetramethylene ether glycol and an aqueous layer. The aqueous layer is then discarded and the remaining organic layer is washed with water to remove impurities such as residual catalyst thereby to obtain a pure polytetramethylene ether glycol product.

Prior to the washing operation, the organic layer can be mixed with a suitable organic solvent capable of dissolving polytetramethylene ether glycol and having a low solubility in water, such as benzene, toluene, xylene, butanol, etc. The solvent is preferably used in an amount of 50 to 300 wt % based on the tetrahydrofuran used in the polymerization stage. After washing with water, the solvent is removed from the organic layer by vacuum distillation. With this method, separability into an organic and an aqueous layer is improved so that the catalyst residue may be easily removed and the loss of the polytetramethylene ether glycol product due to dissolution may be minimized.

In either case, the washing water is used in an amount of 50 to 300 wt % based on the tetrahydrofuran used in each washing operation. The washing is generally conducted 3 to 5 times.

As described in the foregoing, it becomes possible to obtain polytetramethylene ether glycol with both increased yield and average molecular weight by using as catalyst, the lithium halide in conjunction with fuming sulfuric acid in ring opening polymerization of tetrahydrofuran. This is impossible with fuming sulfuric acid alone. That is, when fuming sulfuric acid is used by itself as the catalyst, the yield of the glycol is as low as 20 to 60% and it is difficult to obtain the tetramethylene ether glycol having the average molecular weight of larger than about 1000. In contrast, with the catalyst system according to this invention, polytetramethylene ether glycol having the average molecular weight of larger than about 1000 may be easily obtained in a high yield of 55 to 75%. Moreover, the average molecular weight of the glycol product may be controlled in the range of 1000 to 3000 at will by properly adjusting the amounts of fuming sulfuric acid and the lithium halide. These advantageous effects can be obtained only by using the lithium halide in combination with fuming sulfuric acid as the catalyst, i.e. halides of other alkali metals than lithium fail to exhibit such effects as will be appreciated in comparative examples 3 through 5 which follow.

Further, the process of this invention is very advantageous industrially because the catalyst is inexpensive.

The following examples further illustrate the process of this invention.

EXAMPLE 1

In a four-necked separable flask having inner volume of 500 ml and equipped with a stirer, 200 g of tetrahydrofuran were placed and was maintained at 0° to 5° C. in an ice-salt bath with stirring, to which were then added 1.2 g of white powdery anhydrous lithium chloride. Thereafter, 38.9 g of fuming sulfuric acid containing free sulfuric anhydride in the concentration of 30 wt % were added dropwise at 0° to 5° C. for 1 hour. After completion of the addition, the temperature was kept at 0° C. for 2 hours to conduct the polymerization of the tetrahydrofuran. The resulting polymerization mass was then added with 200 g of water to terminate the polymerization. After connecting a distillation tube to the top of the separable flask and replacing the ice bath with an oil bath, unreacted tetrahydrofuran and a portion of the water were removed by azeotropic distillation. Then, the distillation tube was replaced with a reflux condenser and the remaining reaction mixture was subjected to hydrolysis at 80° to 90° C. for 2 hours. After cooling, the resulting product was allowed to stand to be separated into an aqueous layer and an organic layer. After discarding the aqueous layer, 100 g of toluene and 100 g of water were added to the organic layer. After stirring, the mixture was allowed to stand for the separation into a toluene layer and an aqueous layer. The aqueous layer was discarded and the toluene layer was washed twice with 100 g of water. After washing, the toluene layer was subjected to vacuum distillation for the removal of the toluene and small amount of water dissolved therein, whereby to leave 124.4 g of polytetramethylene ether glycol. The yield and average molecular weight of the glycol product were found to be 62.2% and 1554, respectively. The average molecular weight was determined in accordance with JIS (Japanese Industrial Standard) K 1557 by measuring OH value. This average molecular weight was found to be almost equal to a value which was obtained from a gel permeation chromatographical analysis. The polytetramethylene ether glycol thus obtained was found to contain no chlorine.

COMPARATIVE EXAMPLE 1

Polymerization of tetrahydrofuran and the after-treatment of the resulting product were conducted in the same manner as above example 1 except that no lithium chloride was employed. As a result, the yield and average molecular weight of the polytetramethylene ether glycol product were found to be 44.0% and 846, respectivey.

EXAMPLES 2-9 AND COMPARATIVE EXAMPLE 2

Preparation of polytetramethylene ether glycol by the polymerization of tetrahydrofuran was conducted in the same manner as in example 1 varying the concentration of SO₃ in fuming sulfuric acid, the amounts of fuming sulfuric acid and lithium chloride and polymerization time as indicated in a table 1 below. The results are also summarized in the table 1.

Table 1

| Example No. | Amount of Tetrahydrofuran (g) | Catalyst Components and Amounts | | Lithium Chloride (g) | Polymerization Conditions | | Polytetramethylene Ether Glycol | |
|---|---|---|---|---|---|---|---|---|
| | | Fuming Sulfuric Acid | | | | | | Average |
| | | $SO_3$ Concentration (%) | (g) | | Temperature (°C.) | Time (hr) | Yield (%) | Molecular Weight (from OH value) |
| 2 | 200 | 30 | 38.9 | 0.3 | 0 | 2 | 60.1 | 1011 |
| 3 | " | " | " | 0.6 | " | " | 61.4 | 1214 |
| 4 | " | " | " | 1.8 | " | " | 74.2 | 1633 |
| 5 | " | " | " | 2.3 | " | " | 65.9 | 2054 |
| 6 | " | " | " | 1.2 | " | 3 | 67.0 | 1516 |
| 7 | " | " | 19.4 | " | " | 2 | 54.3 | 2771 |
| 8 | " | " | 27.9 | 3.0 | " | " | 62.3 | 3010 |
| 9 | " | 20 | 58.4 | 1.2 | " | " | 60.5 | 1620 |
| Comparative Example 2 | " | 30 | 19.4 | 0 | " | " | 27.8 | 905 |

EXAMPLES 10-12

Using lithium fluoride in place of lithium chloride and varying the amount of the fluoride, polytetramethylene ether glycol was produced by the polymerization of tetrahydrofuran in the same manner as in the example 1. The results were as shown in table 2 below.

Table 2

| Example No. | Amount of Tetrahydrofuran (g) | Catalyst Components and Amounts | | | Polymerization Conditions | | Polytetramethylene Ether Glycol | |
|---|---|---|---|---|---|---|---|---|
| | | Fuming Sulfuric Acid | | Lithium Fluoride (g) | | | | Average Molecular Weight (from OH value) |
| | | SO₃ Concentration (%) | (g) | | Temperature (° C.) | Time (hr) | Yield (%) | |
| 10 | 200 | 30 | 38.9 | 0.6 | 0 | 2 | 65.1 | 1437 |
| 11 | " | " | " | 1.2 | " | " | 68.9 | 1910 |
| 12 | " | " | " | 1.8 | " | " | 72.5 | 2454 |

The polytetramethylene ether glycol produced in the examples 10 through 12 was found to contain no fluorine.

COMPARATIVE EXAMPLES 3-5

Using sodium chloride, potassium chloride or sodium fluoride in place of the lithium chloride, the example 1 was repeated to conduct polymerization of tetrahydrofuran. The results are summarized in table 3 below.

Table 3

| Comparative Example No. | Amount of Tetrahydrofuran (g) | Catalyst Components and Amounts | | | Polymerization Conditions | | Polytetramethylene Ether Glycol | |
|---|---|---|---|---|---|---|---|---|
| | | Fuming Sulfuric Acid | | Alkali halides (g) | | | | Average Molecular Weight (from OH value) |
| | | SO₃ Concentration (%) | (g) | | Temperature (° C.) | Time (hr) | Yield (%) | |
| 3 | 200 | 30 | 38.9 | NaCl 1.2 | 0 | 2 | 40.7 | 835 |
| 4 | " | " | " | KCl 1.2 | " | " | 46.9 | 907 |
| 5 | " | " | " | NaF 1.2 | " | " | 42.4 | 870 |

From the table 3 it is apparent that, with halides of other alkali metals than lithium, the yields of polytetramethylene ether glycol are poor and the average molecular weights thereof are below 1000. Thus, only by using a lithium halide as a component of the polymerization catalyst, polytetramethylene ether glycol having average molecular weight of at least 1000 can be produced in a high yield.

What is claimed is:

1. A process for the production of polytetramethylene ether glycol comprising subjecting tetrahydrofuran to a ring opening polymerization at a temperature of −40° to 50° C. in the presence of: (a) a lithium halide selected from the group consisting of lithium chloride, lithium fluoride, lithium iodide, lithium bromide, and mixtures thereof and (b) fuming sulfuric acid containing free sulfuric anhydride in a concentration of 3 to 45 weight percent, the amount of the lithium halide being 0.001 to 20 percent by weight of the tetrahydrofuran, the amount of the fuming sulfuric acid being 3 to 60 percent by weight of the tetrahydrofuran, terminating the polymerization with water, and hydrolyzing the polymerization product to convert sulfuric acid terminal groups of the product to hydroxyl groups.

2. A process as claimed in claim 1, wherein the lithium halide is lithium fluoride or lithium chloride.

3. A process as claimed in claim 2, wherein the lithium halide is used in an amount of 0.01 to 10 wt % based on the tetrahydrofuran.

4. A process as claimed in claim 2, wherein the lithium halide is used in an amount of 0.05 to 5 wt % based on the tetrahydrofuran.

5. A process as claimed in claim 2, wherein the fuming sulfuric acid contains free sulfuric anhydride in the concentration of 10 to 40 wt %.

6. A process as claimed in claim 2, wherein the fuming sulfuric acid is used in an amount of 5 to 45 wt % based on the tetrahydrofuran.

7. A process as claimed in claim 2, wherein the lithium halide and the fuming sulfuric acid are added to the tetrahydrofuran at a temperature of −40° to 50° C.

8. A process as claimed in claim 2, wherein the lithium halide and the fuming sulfuric acid are added to the tetrahydrofuran at a temperature of −20° to 30° C.

9. A process as claimed in claim 2, wherein the ring opening polymerization of the tetrahydrofuran is performed at a temperature of −40° to 50° C. for a time period of 30 minutes to 10 hours.

10. A process as claimed in claim 2, wherein the ring opening polymerization of the tetrahydrofuran is performed at a temperature of −20° to 30° C. for a time period of 1 to 5 hours.

11. A process as claimed in claim 2, wherein the ring opening polymerization of the tetrahydrofuran is conducted using an organic solvent.

12. A process as claimed in claim 11, wherein the organic solvent is selected from the group consisting of butane, pentane, hexane, octane, isooctane, cyclohexane, methylcyclohexane, decahydronaphthalene, methylene chloride, chloroform, carbon tetrachloride, 1,2-dichloroethane, ethyl ether, isopropyl ether, butyl ether, isoamyl ether and dioxane.

13. A process as claimed in claim 11, wherein the organic solvent is used in an amount of 5 to 200 wt % based on the tetrahydrofuran.

14. A process as claimed in claim 2 wherein prior to said hydrolysis unreacted tetrahydrofuran is removed from the reaction mixture.

15. A process as claimed in claim 2 wherein said hydrolysis comprises heating the polymerization reaction mass with water.

16. A process as claimed in claim 15 wherein the total amount of water used to terminate the polymerization and to effect said hydrolysis is 50 to 300% by weight of the tetrahydrofuran.

17. A process as claimed in claim 15, wherein the heating is performed at a temperature of 70° to 100° C. for a time period of 1 to 3 hours.

18. A process as claimed in claim 16 wherein the hydrolyzed product is recovered by allowing the reaction mixture to separate into an organic layer and an aqueous layer, discarding the aqueous layer, and then washing the remaining organic layer with water.

19. A process as claimed in claim 17 wherein prior to the washing operation, the organic layer is mixed with an organic solvent selected from the group consisting of benzene, toluene, xylene and butanol in an amount of 50 to 300 wt % based on the weight of the tetrahydrofuran used in the polymerization, and then after the washing operation, the organic layer is vacuum distilled to remove the organic solvent.

* * * * *